(12) United States Patent
Lee et al.

(10) Patent No.: US 6,497,021 B2
(45) Date of Patent: Dec. 24, 2002

(54) METHOD AND APPARATUS FOR PROVIDING A LOW COST CONTACT BURNISH SLIDER

(75) Inventors: Francis Chee-Shuen Lee, San Jose, CA (US); Michael Lee McGhee, San Jose, CA (US); Salvador Navarro, Hollister, CA (US); Ullal Vasant Nayak, San Jose, CA (US); Hang Fai Ngo, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/231,424

(22) Filed: Jan. 14, 1999

(65) Prior Publication Data

US 2002/0162204 A1 Nov. 7, 2002

(51) Int. Cl.<sup>7</sup> ............................................. B24B 39/00
(52) U.S. Cl. .................. 29/90.01; 451/290; 451/317
(58) Field of Search ....................... 29/90.01; 451/63, 451/103, 146, 246, 254, 290, 312, 317, 324, 552, 555, 557, 558

(56) References Cited

U.S. PATENT DOCUMENTS

| | | | |
|---|---|---|---|
| 4,212,044 A | 7/1980 | Plotto | |
| 4,225,891 A | 9/1980 | Plotto | |
| 4,330,910 A | 5/1982 | Schachl et al. | |
| 4,802,042 A | 1/1989 | Strom | |
| 4,845,816 A | 7/1989 | Nanis | |

(List continued on next page.)

FOREIGN PATENT DOCUMENTS

| | | |
|---|---|---|
| EP | 0 231 625 A1 | 8/1987 |
| EP | 0 231 625 B1 | 3/1990 |
| EP | 0 427 612 A1 | 5/1991 |
| JP | 53-29111 | 3/1978 |
| JP | 56-3436 | 1/1981 |

(List continued on next page.)

OTHER PUBLICATIONS

"Disk Burnishing Head Design for High Performance Disk Files", IBM TDB, vol. 26, No. 6, 2953–4, Nov. 1983.*

(List continued on next page.)

Primary Examiner—David P. Bryant
Assistant Examiner—Essama Omgba
(74) Attorney, Agent, or Firm—Altera Law Group, LLC

(57) ABSTRACT

A method and apparatus for providing a low cost contact burnish slider is disclosed that can remain in contact or at the initial low flying heights even as the pad surfaces and leading edges wear. The burnish slider includes a body having a leading edge and a trailing edge and an air bearing surface being configured at the leading edge of the body to cut disk asperities as the slider flies and configured away from the leading edge to maintain a flying attitude wherein the leading edge is near the data recording surface and to provide restoring forces to maintain the flying attitude. The air bearing surface may include a front pad proximal to the leading edge and a rear pad distal to the leading edge. Alternatively, the air bearing surface may include two front pads proximal to the leading edge on opposite sides of the body and two rear pads distal to the leading edge and disposed on opposite sides of the body. The front and rear pad(s) extends substantially across the body of the slider. An offset pivot is provided for constraining the moment balance of the slider to provide a low pitch flying attitude. The rear pad(s) further includes a mechanical taper proximal to the trailing edge to minimize load/unload damage. The air bearing surface configuration away from the leading edge provides a force that restores the flying attitude to the slider when an impulse lifting the leading edge is encountered.

20 Claims, 7 Drawing Sheets

U.S. PATENT DOCUMENTS

| | | | |
|---|---|---|---|
| 5,021,906 A | | 6/1991 | Chang et al. |
| 5,063,712 A | | 11/1991 | Hamilton et al. |
| 5,086,360 A | * | 2/1992 | Smith et al. ............. 360/236.6 |
| 5,424,888 A | | 6/1995 | Hendriks et al. |
| 5,479,306 A | * | 12/1995 | Ananth et al. ........... 360/235.7 |
| 5,658,191 A | | 8/1997 | Brezoczky |
| 5,782,680 A | * | 7/1998 | Pilsan ....................... 451/317 |
| 5,863,237 A | * | 1/1999 | Felts et al. .................... 451/41 |
| 5,880,899 A | * | 3/1999 | Blachek et al. ............... 360/66 |
| 5,942,680 A | * | 8/1999 | Boutaghou ................... 73/105 |
| 5,980,369 A | * | 11/1999 | Burga et al. ................ 451/317 |
| 6,004,472 A | * | 12/1999 | Dorius et al. ................. 216/22 |
| 6,017,264 A | * | 1/2000 | Strom ......................... 451/41 |
| 6,183,349 B1 | * | 2/2001 | Burga et al. .................. 451/41 |
| 6,230,380 B1 | * | 5/2001 | Wang et al. ............... 29/90.01 |
| 6,249,945 B1 | * | 6/2001 | Lee ........................... 29/90.01 |
| 6,267,645 B1 | * | 7/2001 | Burga et al. .................. 451/41 |
| 6,273,793 B1 | * | 8/2001 | Liners et al. ................. 451/41 |
| 6,296,552 B1 | * | 10/2001 | Boutaghou ................... 451/41 |
| 6,309,283 B1 | * | 10/2001 | Liners et al. ................. 451/41 |
| 6,322,431 B1 | * | 11/2001 | Schaenzer et al. .......... 451/317 |
| 6,357,095 B1 | * | 3/2002 | Duan et al. ................ 29/90.01 |
| 6,358,123 B1 | * | 3/2002 | Liners et al. ................. 451/41 |
| 6,419,551 B1 | * | 7/2002 | Smith ........................... 451/8 |

FOREIGN PATENT DOCUMENTS

| | | |
|---|---|---|
| JP | 57-33438 | 2/1982 |
| JP | 57-82249 | 5/1982 |
| JP | 59-81058 | 5/1984 |
| JP | 60-249569 | 12/1985 |
| JP | 61-51616 | 3/1986 |
| JP | 62-44371 | 2/1987 |
| JP | 64-46275 | 2/1989 |
| JP | 6-68632 | 3/1994 |
| JP | 6-195703 | 7/1994 |
| JP | 7-65342 | 3/1995 |

OTHER PUBLICATIONS

"Blade Burnish Slider", *IBM Technical Disclosure Bulletin*, 35(3):153–154 (Aug. 1992).

"Zero Pitch Burnish Head", *IBM Technical Disclosure Bulletin*, 35(4A):421 (Sep. 1992).

* cited by examiner

- Leakage reduces lift force of bars
- diamond shape further reduces the lift force of the pad
- maximum lift force helps define bounds on the effect of pad wear

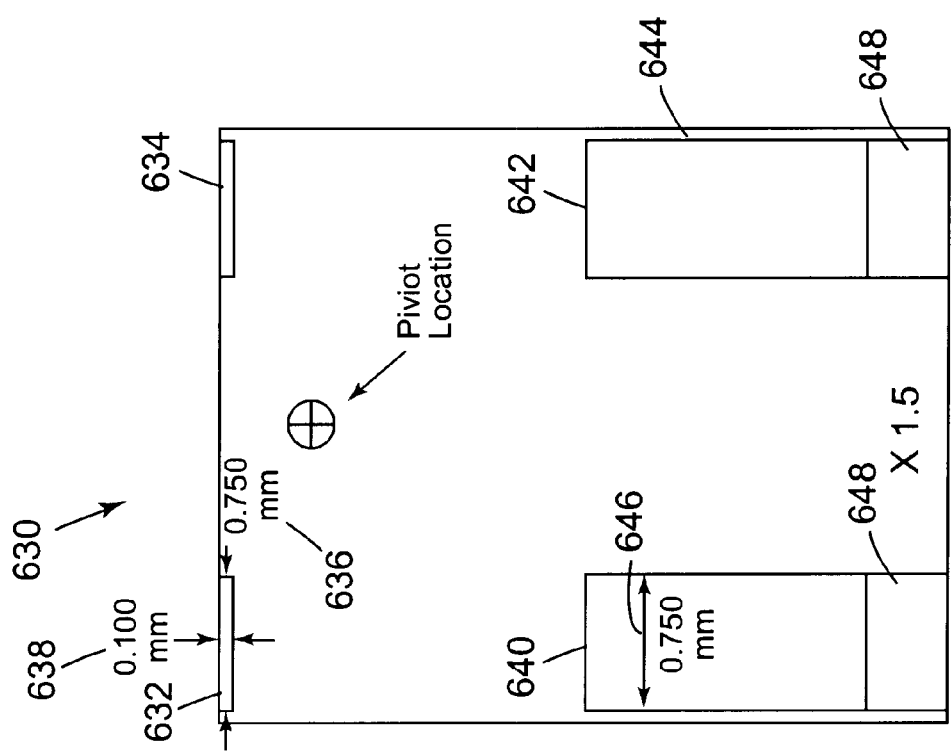
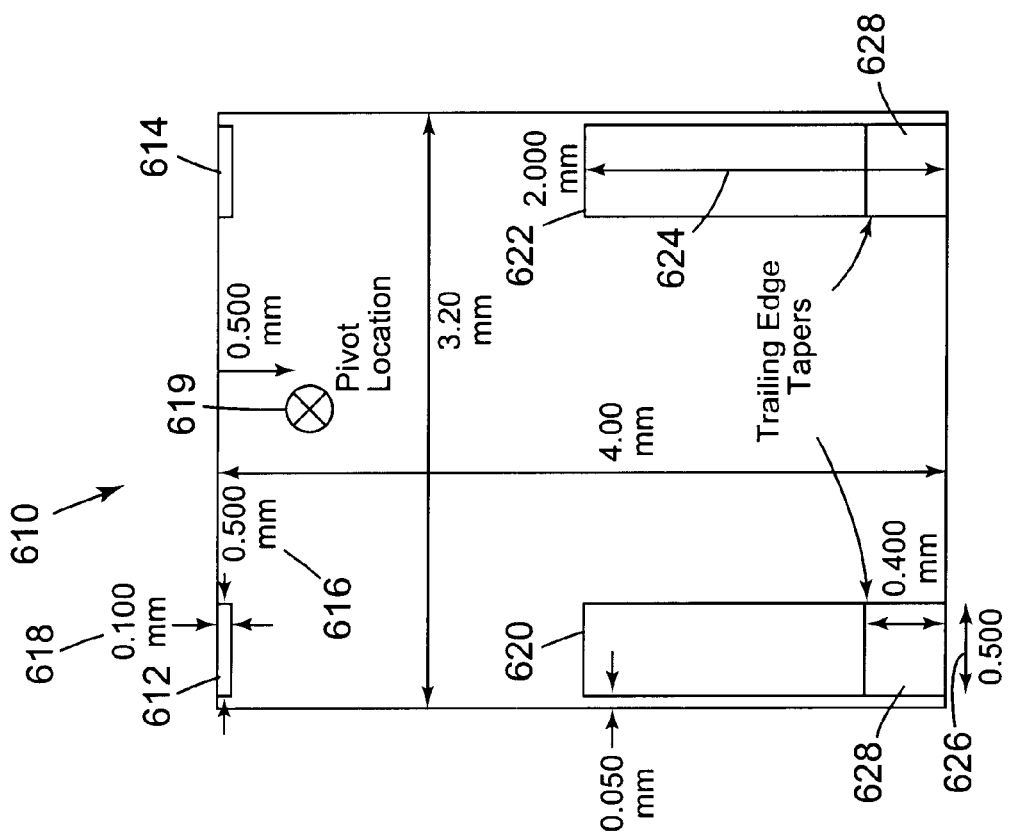
Fig. 6b
Fig. 6a

METHOD AND APPARATUS FOR PROVIDING A LOW COST CONTACT BURNISH SLIDER

BACKGROUND OF THE INVENTION

1. Field of the Invention

This invention relates in general to the manufacture of storage disks used in the computer field, and more particularly to a method and apparatus for providing a low cost contact burnish slider.

2. Description of Related Art

Hard disks are used to store information, typically coded information, utilized for data processing. An advantage of such a disk is that it can provide high-speed random access to data stored thereon. Information may be read from or written to any selected area on the memory surface of such a disk. The reading or writing of data may be performed without having to serially search the full contents of the disk to have access to a selected memory location. Generally, a hard disk is mounted with a disk drive, which includes a motor for rotating the hard disk and an actuator for moving a transducer relative to the surface of the rotating hard disk to provide access to circumferential tracks on the hard disk. A plurality of disks may be mounted on a single spindle in spaced relationship to one another and transducers are provided to interact with opposite planar surfaces of each of the disks.

The disks are typically magnetic disks which includes a magnetic surface for recording information thereon. Moreover, the heads which interact with each of the surfaces are referred to as "flying heads." Thus, the flying heads do not touch the surface of the disk during the rotation of the disk. Instead, the flying heads ride on an air bearing that is created between the slider and the disk. The air bearing prevents wear of either the head or the disk surface by reducing or eliminating contacts as the head and the disk surface experience relative movement. Wear of the disk surface due to contact results in the loss of information stored on the magnetic disk.

Accordingly, in a magnetic recording file, a ceramic slider with a magnetic recording head flies at very close spacings over a magnetic recording disk, e.g., on the order of tens of nanometers. To ensure reliability of the interface between the slider and the disk surface, the magnetic recording disk should be made as smooth and free of asperities as possible to eliminate contact between the ceramic slider flying over the surface of this disk. The absence of contact due to asperities on magnetic disks at the flying height of the data heads is tested by flying specially designed sliders called glide sliders which are sensitive to asperity contact. This test is called a glide test and disks that fail this test cannot be used in the magnetic recording file.

There are a number of steps taken to make the magnetic recording disk smooth. One step is to put the layers of the magnetic media on a smooth mechanically polished disk substrate of glass, aluminum with a plated nickel phosphorous layer or some other materials that can be polished to a smooth finish. A smooth finish provides a disk with relatively few asperities, but additional processes to eliminate all asperities up to the flying height of the data heads are necessary to ensure the reliability of the slider/disk interface. These additional steps have traditionally been called disk burnishing.

One such step is slider burnish. In contrast to sliders forming the data heads in a typical disk drive, burnish sliders are designed to fly at flying heights lower than the data heads in the magnetic recording files and must have surfaces that can cut or abrade asperities. Burnish sliders have significant asperity contact and therefore have to fly at stable, low flying heights even when their air-bearing surfaces have wear on pad surfaces and edges.

The basic problem for burnish sliders is to remain in contact or at the initial low flying heights even as the pad surfaces and leading edges wear. As various air-bearing surfaces wear, the air-bearing surfaces build up an effective taper that can change the flying height of the burnish slider and render it ineffective at burnishing asperities of the disk surface. The consequence of inefficient slider burnish is that disks have asperities remaining that are detected at glide test and are rejected. In addition smaller asperities that pass glide may remain on the disk and reduce the overall reliability of the files in which these disks are used.

It can be seen that there is a need for a burnish slider that can remain in contact or at the initial low flying heights even as the pad surfaces and leading edges wear.

SUMMARY OF THE INVENTION

To overcome the limitations in the prior art described above, and to overcome other limitations that will become apparent upon reading and understanding the present specification, the present invention discloses a method and apparatus for providing a low cost contact burnish slider.

The present invention solves the above-described problems by providing a burnish slider that can remain in contact or at the initial low flying heights even as the pad surfaces and leading edges wear.

A system in accordance with the principles of the present invention includes a body having a leading edge and a trailing edge and an air bearing surface being configured at the leading edge of the body to cut disk asperities as the slider flies and configured away from the leading edge to maintain a flying attitude wherein the leading edge is near the data recording surface and to provide restoring forces to maintain the flying attitude.

Other embodiments of a system in accordance with the principles of the invention may include alternative or optional additional aspects. One such aspect of the present invention is that the air bearing surface includes a front pad proximal to the leading edge and a rear pad distal to the leading edge. Alternatively, the air bearing surface may include two front pads proximal to the leading edge on opposite sides of the body and two rear pads distal to the leading edge and disposed on opposite sides of the body.

Another aspect of the present invention is that the front and rear pad(s) extends substantially across the body of the slider.

Another aspect of the present invention is that the front pad(s) includes a small area for exerting a small air bearing force relative to a suspension load and an air bearing force created by the rear pad(s).

Another aspect of the present invention is that the rear pad(s) has an air bearing surface substantially greater than the front pad(s).

Another aspect of the present invention is that the rear pad(s) extends substantially from a midpoint of the body to the trailing edge.

Another aspect of the present invention is that an offset pivot is provided for constraining the moment balance of the slider to provide a low pitch flying attitude.

Another aspect of the present invention is that the rear pad(s) further includes a mechanical taper proximal to the trailing edge to minimize load/unload damage.

Another aspect of the present invention is that the air bearing surface configuration away from the leading edge provides a force that restores the flying attitude to the slider when an impulse lifting the leading edge is encountered.

Another aspect of the present invention is that the front pads have a width and the rear pads have a width, the width of the front and rear pads being substantially equal.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout:

FIGS. 6a–d illustrated burnish slider designs that increase the burnishing or decrease the burnish cycle time as additional members of the burnish slider family.

DETAILED DESCRIPTION OF THE INVENTION

In the following description of the exemplary embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

The present invention provides a burnish slider that can remain in contact or at the initial low flying heights even as the pad surfaces and leading edges wear.

Figure 1:
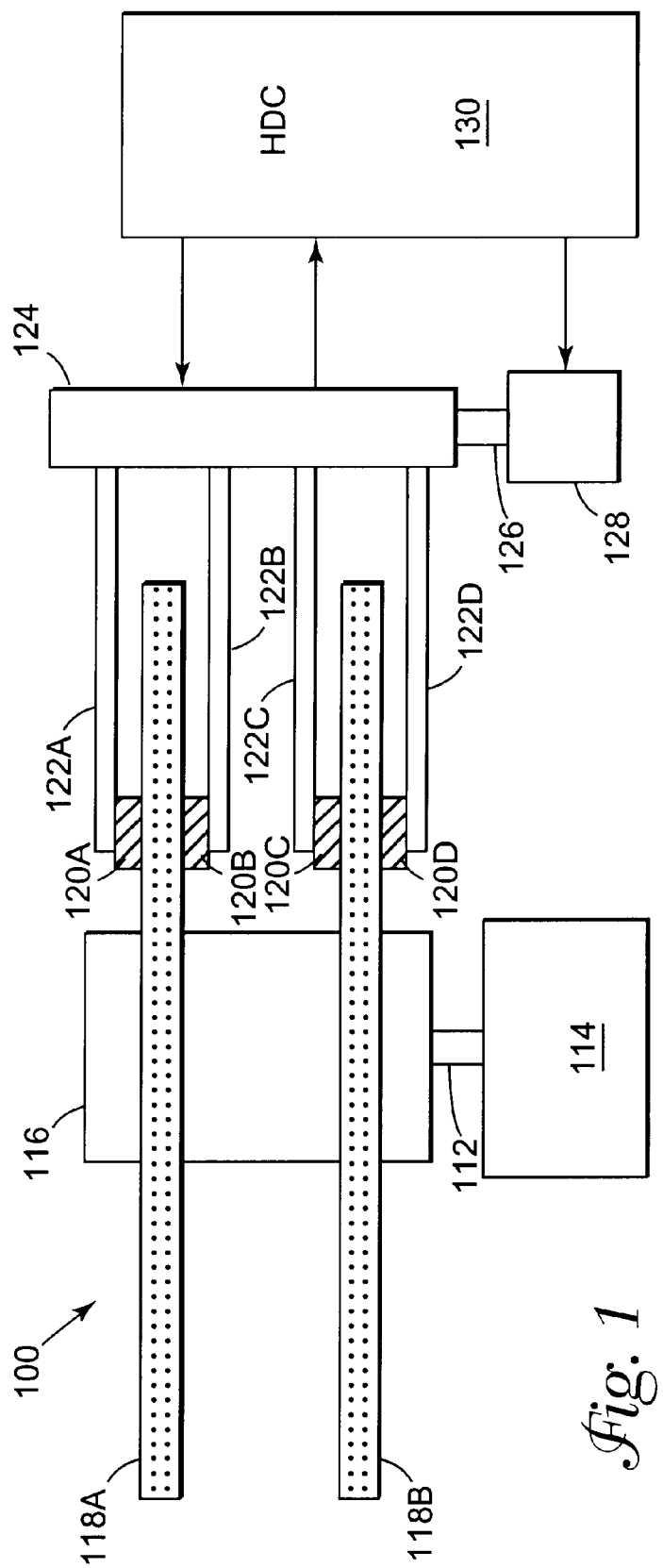
FIG. 1 illustrates a hard disk drive including disks according to the present invention.

FIG. 1 illustrates a hard disk drive (HDD) 100 including disks 118A, 118B according to the present invention. The HDD 100 includes a disk 118 and a hard disk controller (hereinafter referred to as HDC) 130. The disk part has a motor 114 for rotating a shaft 112 at a high speed. A cylindrical support 116 is attached to the shaft 112 so that their axes are in coincidence. One or more information recording disks 118A and 118B are mounted between support 116. Magnetic heads 120A, 120B, 120C and 120D are respectively provided to face the disk surface, and these magnetic heads are supported from an actuator 124 by access arms 122A, 122B, 122C, and 122D, respectively. The individual magnetic heads 120A to 120D receive the drive force transmitted from an actuator drive device 128 by a shaft 126 and rotates about the shaft 126 as the axis of rotation, and fly over the disk 118 to a predetermined position.

Figure 2:
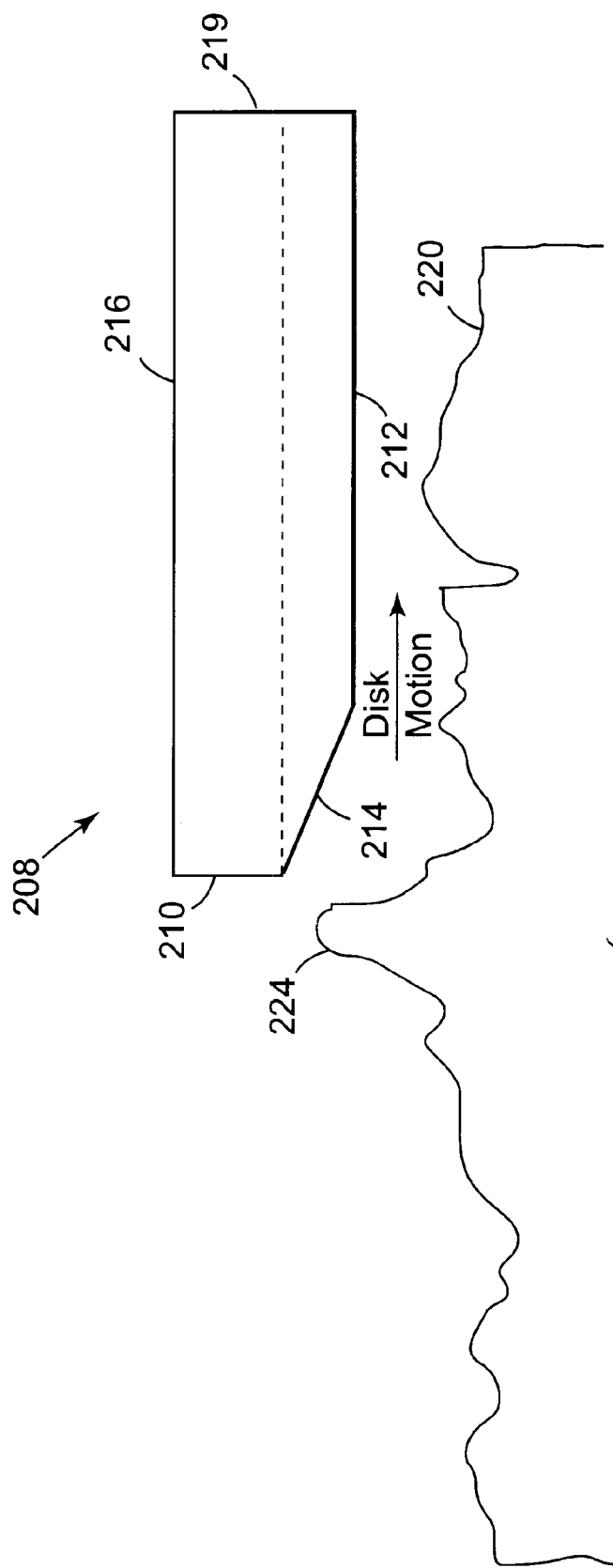
FIG. 2 illustrates a side view of a slider encountering an asperity on the surface of a disk.

FIG. 2 illustrates a side view 200 of a slider 208 encountering an asperity 224 on the surface of a disk 220. The slider 208 is shown flying above the rough surface of the disk 220. The slider 208 as shown in FIG. 2 comprises rectilinear slider body 210 having a pair of elongated substantially parallel rails 212 disposed along the sides of body 210. Each or the rails 212 has a tapered portion 214 extending back from the leading edge (i.e., facing in the direction of the disk motion). On the opposite side of slider 208 is a planar, top surface 216 which extends the full length from the leading edge to the rear or trailing edge 219.

All sliders designed to fly over a disk maintain a stable equilibrium attitude under the influence of forces and moments from the suspension, the lift from air-bearing forces due to the spinning disk on each of its pad surfaces and possibly contact of a pad or pads with the disk surface. A broad class of burnish sliders having air-bearings according to the present invention may be generated using the force/moment model described above. The burnish sliders according to the present invention continue to fly low to burnish disk asperities even as the slider wears due to disk asperity contact.

Figure 3:
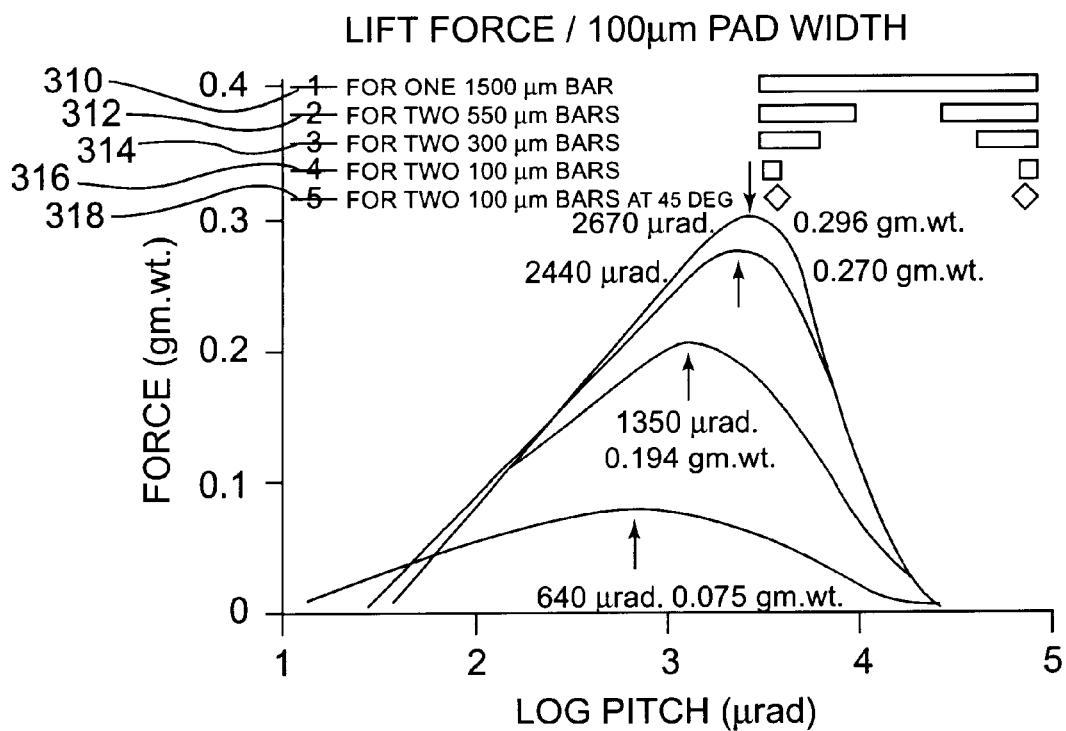
FIG. 3 illustrates a graph of the lift force to log pitch for various burnish pad sizes and geometries.

FIG. 3 illustrates a graph 300 of the lift force to log pitch for various burnish sliders. In FIG. 3, various pad designs 310–318 are graphed to determine the maximum forces the pad can generate—assuming wear with asperities changes the pad pitch during use.

According to the present invention, the front pads of the air-bearing may be used to cut disk asperities as the slider flies in contact or near-contact with the disk surface at near zero pitch. The pad designs according to the present invention are intended to keep the front pads near the disk surface and to provide restoring forces to maintain this flying attitude.

Figure 4:
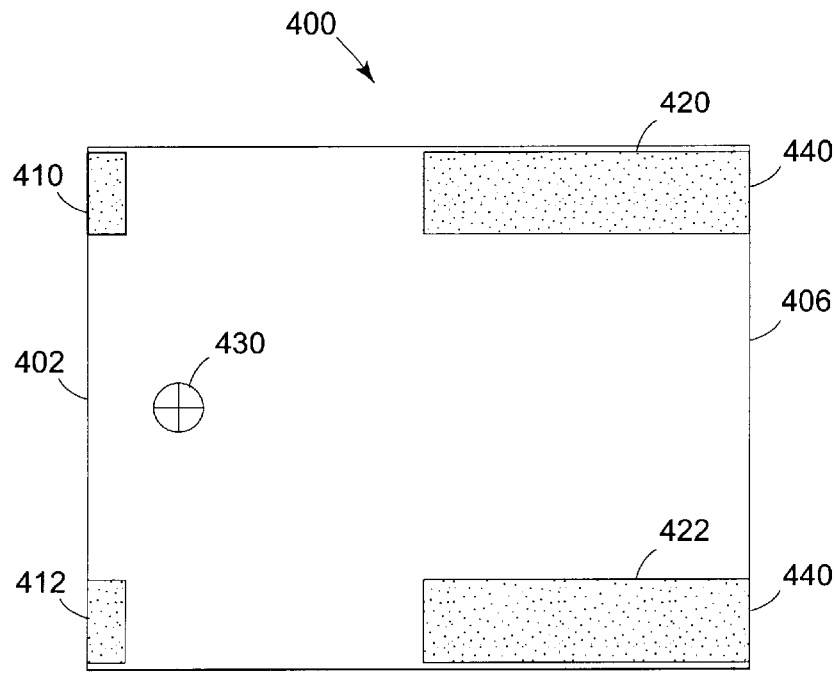
FIG. 4 illustrates a burnish slider according to the present invention.

FIG. 4 illustrates a burnish slider 400 according to the present invention. In FIG. 4, the burnish slider 400 includes front pads 410, 412 that have a small area and exert a small air-bearing forces relative to the gram-load of the suspension or the maximum lift generated by the trailing edge pads 420, 422. The trailing end air-bearing surfaces 420, 422 behind the slider pivot 430 have substantially larger area and can exert considerable air-bearing forces to keep the front pads 410, 412 on or near the disk surface.

Accordingly, the burnish slider 400 according to the present invention includes small front pads 410, 412 with limited load bearing capability, an offset pivot 430 that constrains the moment balance for equilibrium to a low-flying with low pitch condition, trailing pads 420, 422 with an area that is substantially larger than the front pads 410, 412 to maintain the flying attitude with the front pads 410, 412 substantially in contact and the trailing pads 410, 412 fly at low pitch, e.g., a few microradians, to provide a small lift force.

The burnish slider 400 provides a condition where any impulse that would lift the leading edge 402 is balanced by large air-bearing force/moment that results when the trailing pads 420, 422 are pitched upwards resulting in a restoring moment to bring the leading edge 402 back onto the disk. The burnish slider 400 according to the present invention may also include a mechanical taper 440 at the trailing edge 406 to minimize the load/unload damage.

Figure 5:
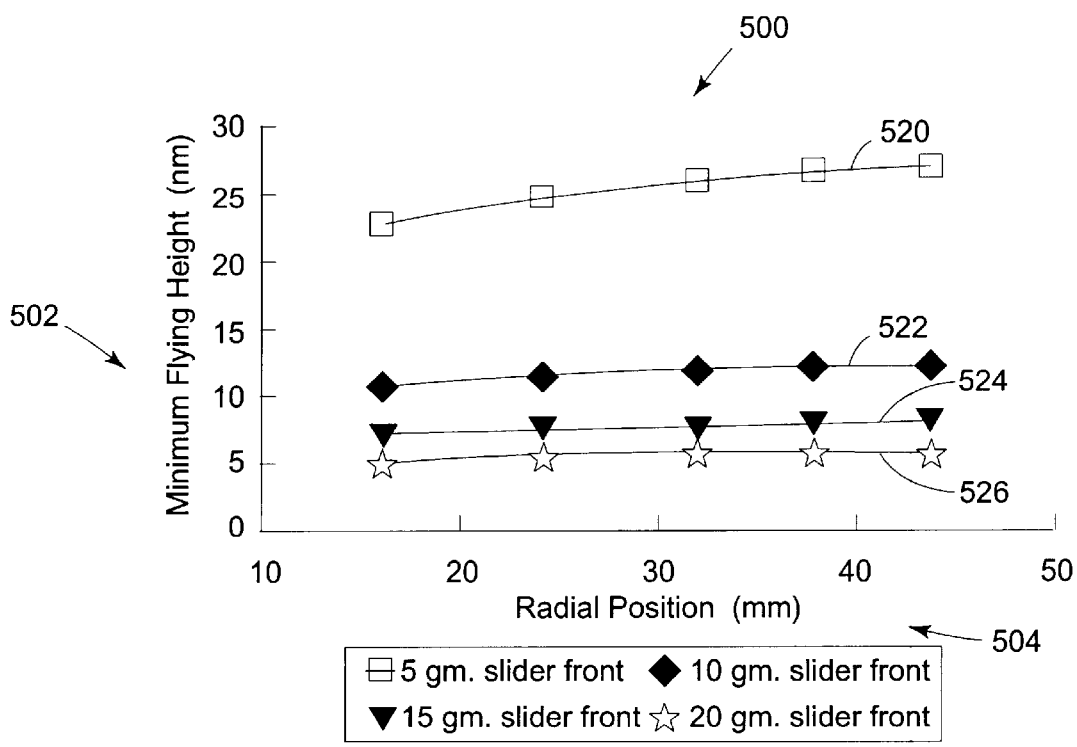
FIG. 5 illustrates a graph of minimum flying height versus radial position.

FIG. 5 illustrates a graph 500 of minimum flying height 502 versus radial position 504. In FIG. 5, the minimum flying height is computed for various suspension gram loads 520, 522, 524, 526 for determining a gram load with a high burnish efficiency and a large process fabrication tolerance window.

In accordance with the principles of the present invention, FIGS. 6a–d illustrated burnish slider designs 610, 630, 650, 670 that increase the burnishing or decrease the burnish cycle time as additional members of the burnish slider family in a 100% form factor. Designs may be implemented in a nano-slider form factor and in non-standard form factors, e.g., where the length of the slider (2.0 mm) is comparable to the nano-slider but the width is twice as wide (3.2 mm). Further, the burnish slider designs according to the present invention may be implemented on any form factor if a disk design requires it, e.g., for micro-file 1" diameter disks, or even on non-standard form factors.

FIG. 6a illustrates a X1 burnish slider 610 having two front pads 612, 614 with a width of 0.5 mm 616 and a length of 0.1 mm 618. The slider 610 includes an offset pivot 619 that constrains the moment balance for equilibrium to a low-flying with low pitch condition. The burnish slider 610 includes two rear pads 620, 622 having a length of 2.0 mm 624 and a width of 0.5 mm 626. The burnish slider 610 of FIG. 6a also includes a mechanical taper 628 at the trailing edge to minimize the load/unload damage.

FIG. 6b illustrates a X1.5 burnish slider 630 having two front pads 632, 634 with a width of 0.75 mm 636 and a length of 0.1 mm 638. The burnish slider 630 includes two rear pads 640, 642 having a length of 2.0 mm 644 and a width of 0.75 mm 646. The burnish slider 630 of FIG. 6b also includes a mechanical taper at 648 the trailing edge to minimize the load/unload damage.

Figure 6D:
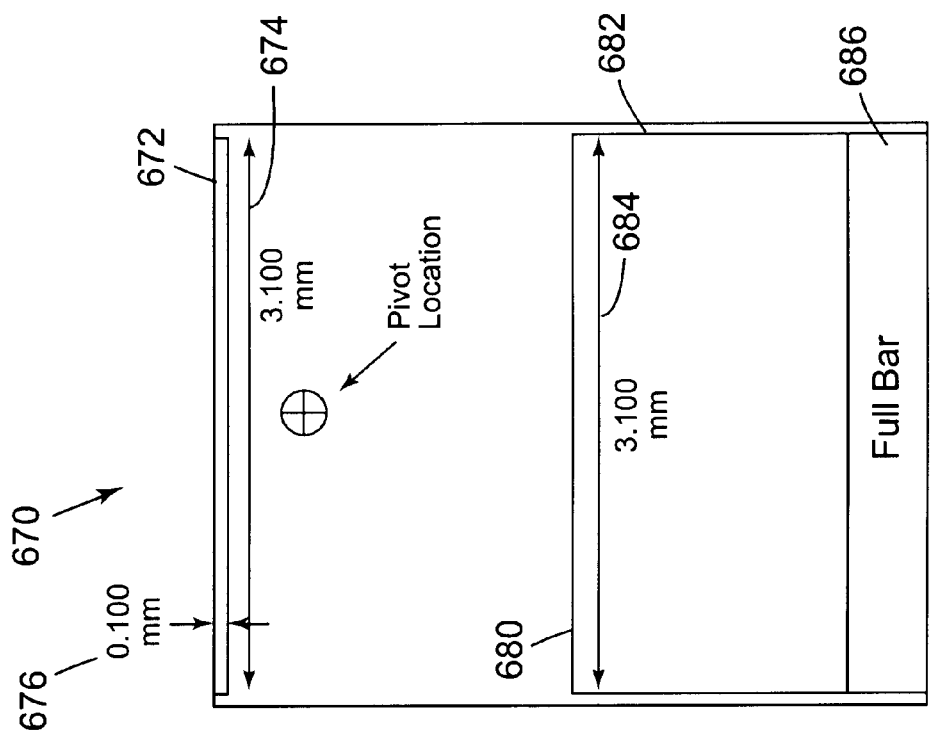
Figure 6C:
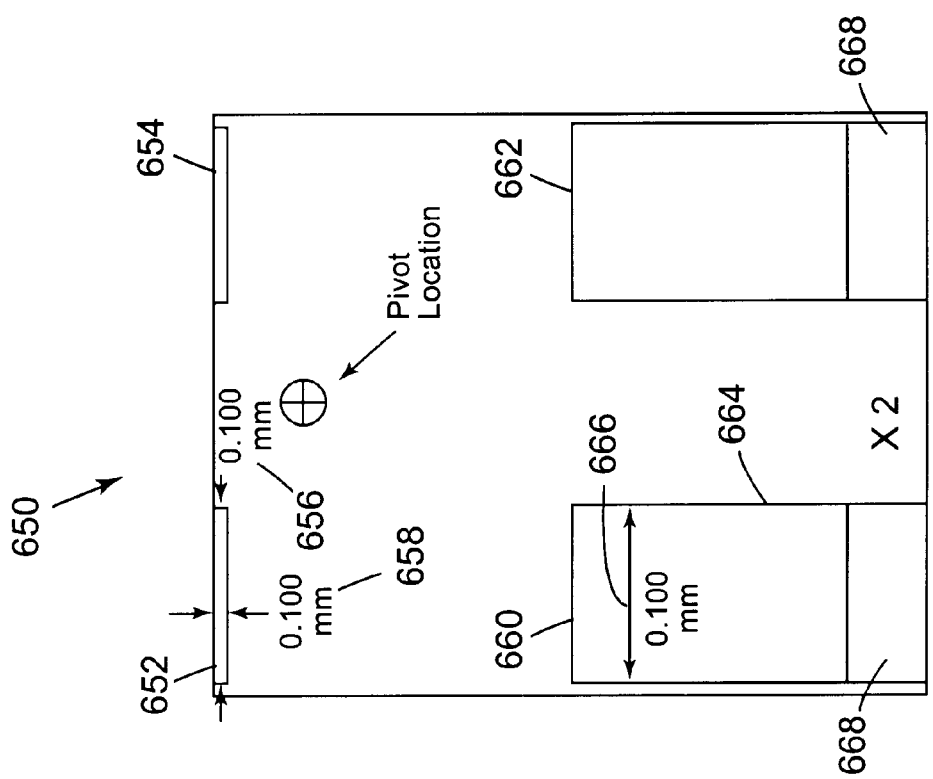

FIG. 6c illustrates a X2 burnish slider 650 having two front pads 652, 654 with a width of 1.0 mm 656 and a length of 0.1 mm 658. The burnish slider 650 includes two rear pads 660, 662 having a length of 2.0 mm 664 and a width of 1.0 mm 666. The burnish slider 650 of FIG. 6c also includes a mechanical taper 668 at the trailing edge to minimize the load/unload damage.

FIG. 6d illustrates a full bar burnish slider 670 having a single front pad 672 and a single rear pad 680. The front pad 672 and the rear pad 680 extend almost the entire length of the slider 670. The front pad 672 has with a width of 3.1 mm 674 and a length of 0.1 mm 676. The rear pad 680 has a length of 2.0 mm 682 and a width of 3.1 mm 684. The burnish slider 670 of FIG. 6d also includes a mechanical taper 686 at the trailing edge to minimize the load/unload damage.

Figure 7:
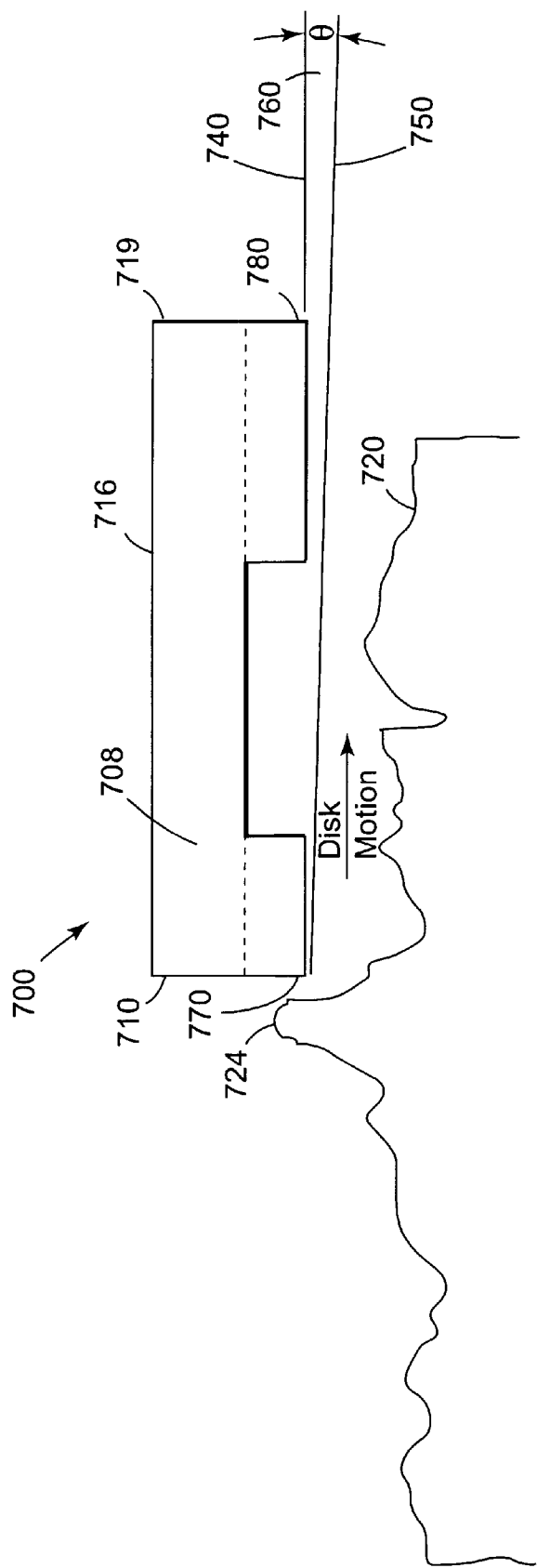
FIG. 7 illustrates a side view of a burnish slider flying at low near zero pitch over the surface of a disk.

FIG. 7 illustrates a side view 700 of a slider 708 encountering an asperity 724 on the surface of a disk 720. The slider 708 is shown flying above the rough surface of the disk 720. The slider 708, as shown in FIG. 7, comprises a slider top portion 716, a slider front portion 710 having a pair of small front pads 770 disposed along the front portion 710 and a pair of trailing pads 780 disposed along a rear portion 719 of the slider 708. Because FIG. 7 is a side view of slider 708, only one front pad 770 and one trailing pad 780 are visible in the figure. The trailing pads 780 are shown having an area substantially larger than the front pads 770. The front pads 770 of the slider 708 may be used to cut disk asperities 724 as the slider flies in contact or near-contact with the disk surface at near zero pitch. The burnish slider 708 according to the present invention is shown flying in a low pitch condition in FIG. 7. The front pads 770 and the trailing pads 780 of slider 708 are shown lying in plane 740, while a horizontal plane 750 defines a plane of disk 720. Slider plane 740 and disk plane 750 are shown at an angle 760 with respect to one another. The angle $\Theta$ 760 may be a few microradians or a few thousandths of a degree.

In summary, a burnish slider is disclosed, which maintains one or a multitude of small leading edge pads in contact with the disk surface to burnish asperities. According to the present invention, the air-bearing surfaces behind the pivot point provides air-bearing generated restoring forces to maintain the contact of the leading edge pads with the disk surface. The trailing edge pads have a taper at the end to minimize damage during dynamic loading. Nominal pitch static attitude is kept positive to allow the trailing edge taper to make contact during loading rather than front pads which are sharp and might scratch the disk. A pivot offset towards the leading edge pads provides the suspension load to keep the leading edge pads close to the disk surface and increase the moment arm of the air-bearing forces generated by the trailing edge pads.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A contact burnish slider for removing asperities from a data recording surface, comprising:
   a body having a leading edge and a trailing edge;
   a burnishing structure disposed at the leading edge of the body to burnish disk asperities as the slider flies;
   an air bearing surface configured to maintain a flying attitude wherein the leading edge is nearer the data recording surface than the trailing edge and to provide restoring forces to maintain the flying attitude; and
   a pivot offset disposed towards the leading edge for providing a suspension load to keep the leading edge closer to the disk surface than the rear edge and to increase the moment arm of the air-bearing forces generated by the air bearing surfaces.

2. The contact burnish slider of claim 1 wherein the burnish structure and air bearing surface extend substantially across the body of the slider.

3. The contact burnish slider of claim 2 wherein the air bearing surface extends substantially from a midpoint of the body to the trailing edge.

4. The contract burnish slider of claim 2 wherein the air bearing surface comprises a rear pad, the rear pad including a mechanical taper proximal to the trailing edge to minimize load/unload damage.

5. The contact burnish slider of claim 1 wherein the air bearing surface is disposed away from the leading edge to provide a force that restores the flying attitude to the slider when an impulse lifting the leading edge is encountered.

6. The contact burnish slider of claim 1 wherein the burnish structure further comprises two front burnish structures proximal to the leading edge on opposite sides of the body and the air bearing surface further comprises two rear pads distal to the leading edge and disposed on opposite sides of the body.

7. The contact burnish slider of claim 6 wherein the rear pads extend substantially from a midpoint of the body to the trailing edge.

8. The contact burnish slider of claim 7 wherein the burnish structures have a width and the rear pads have a width, the width of the burnish structures and rear pads being substantially equal.

9. The contact burnish slider of claim 8 wherein the burnish structures exert a small air bearing force relative to a suspension load and an air bearing force created by the rear pads.

10. The contact burnish slider of claim 9 wherein the rear pads have an air bearing surface substantially greater than the burnish structures.

11. A method for making a contact burnish slider, comprising:

forming a body having a leading edge and a trailing edge;

forming a burnishing structure disposed at the leading edge of the body to burnish disk asperities as the slider flies;

forming an air bearing surface configured to maintain a flying attitude wherein the leading edge is nearer the data recording surface than the trailing edge and to provide restoring forces to maintain the flying attitude; and providing a pivot offset disposed towards the leading edge for providing a suspension load to keep the leading edge closer to the disk surface than the rear edge and to increase the moment arm of the air-bearing forces generated by the air bearing surfaces.

12. The method of claim 10 wherein the forming of the burnish structure and the air bearing surface further comprises forming the burnish structure and the air bearing surfaces substantially extending across the body of the slider.

13. The method of claim 11 wherein the forming of the air bearing surface further comprises forming the air bearing surface substantially extending from a midpoint of the body to the trailing edge.

14. The method of claim 11 wherein the forming of the air bearing surface further comprises forming a rear pad having a mechanical taper proximal to the trailing edge to minimize load/unload damage.

15. The method of claim 11 wherein the forming of the air bearing surface comprises forming the air bearing surface away from the leading edge to provide an air bearing surface that exerts a force for restoring the flying attitude to the slider when an impulse lifting the leading edge is encountered.

16. The method of claim 11 wherein the forming of the burnish structure further comprises forming two front burnish structures and the forming of the air bearing surface further comprises forming two rear pads distal to the leading edge and disposed on opposite sides of the body.

17. The method of claim 16 wherein the forming of the rear pads further comprises forming the rear pads substantially extending from a midpoint of the body to the trailing edge.

18. The method of claim 17 wherein the two front burnish structures and the rear pads are formed having a width, wherein the width of the burnish structures and the rear pads are substantially equal.

19. The method of claim 18 wherein the forming of the two front burnish structures comprises forming two front burnish structures having a small area for exerting a small air bearing force relative to a suspension load and an air bearing force created by the rear pad.

20. The method of claim 19 wherein the forming of the rear pads further comprises creating an air bearing surface for the rear pads that is substantially greater than the air bearing surface of the two front burnish structures.

* * * * *